March 2, 1943.   A. P. FERGUESON   2,312,536
FENDER SHIELD CONSTRUCTION
Filed Feb. 20, 1941   2 Sheets-Sheet 1
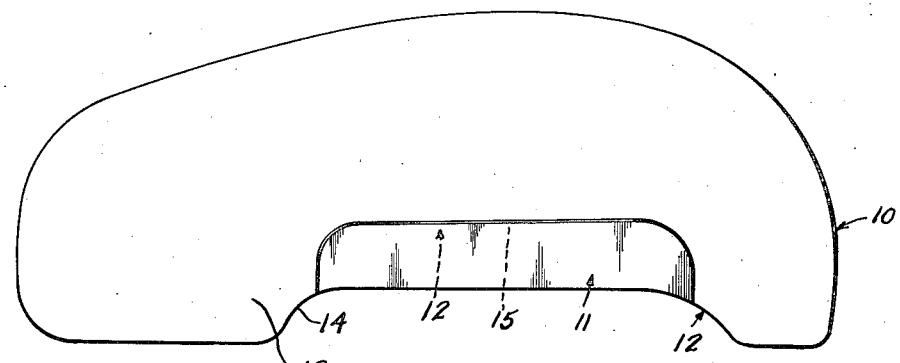
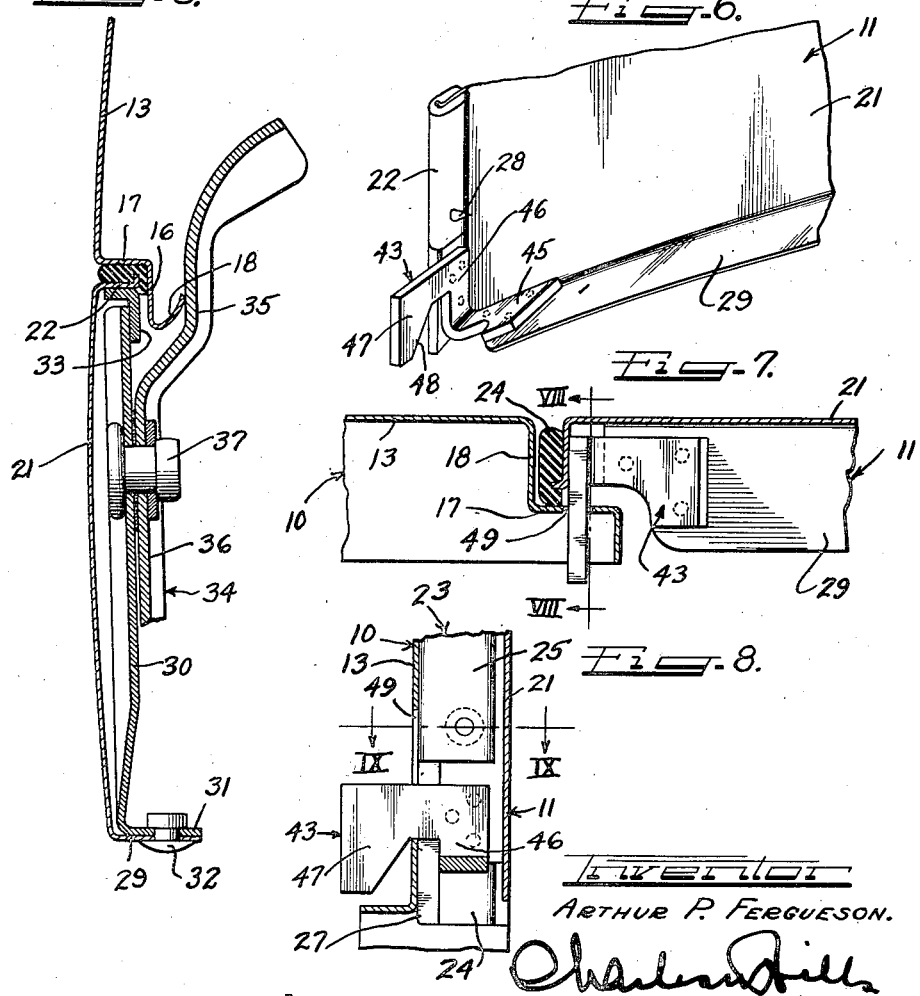
Inventor
ARTHUR P. FERGUESON.

March 2, 1943.  A. P. FERGUESON  2,312,536
FENDER SHIELD CONSTRUCTION
Filed Feb. 20, 1941  2 Sheets-Sheet 2
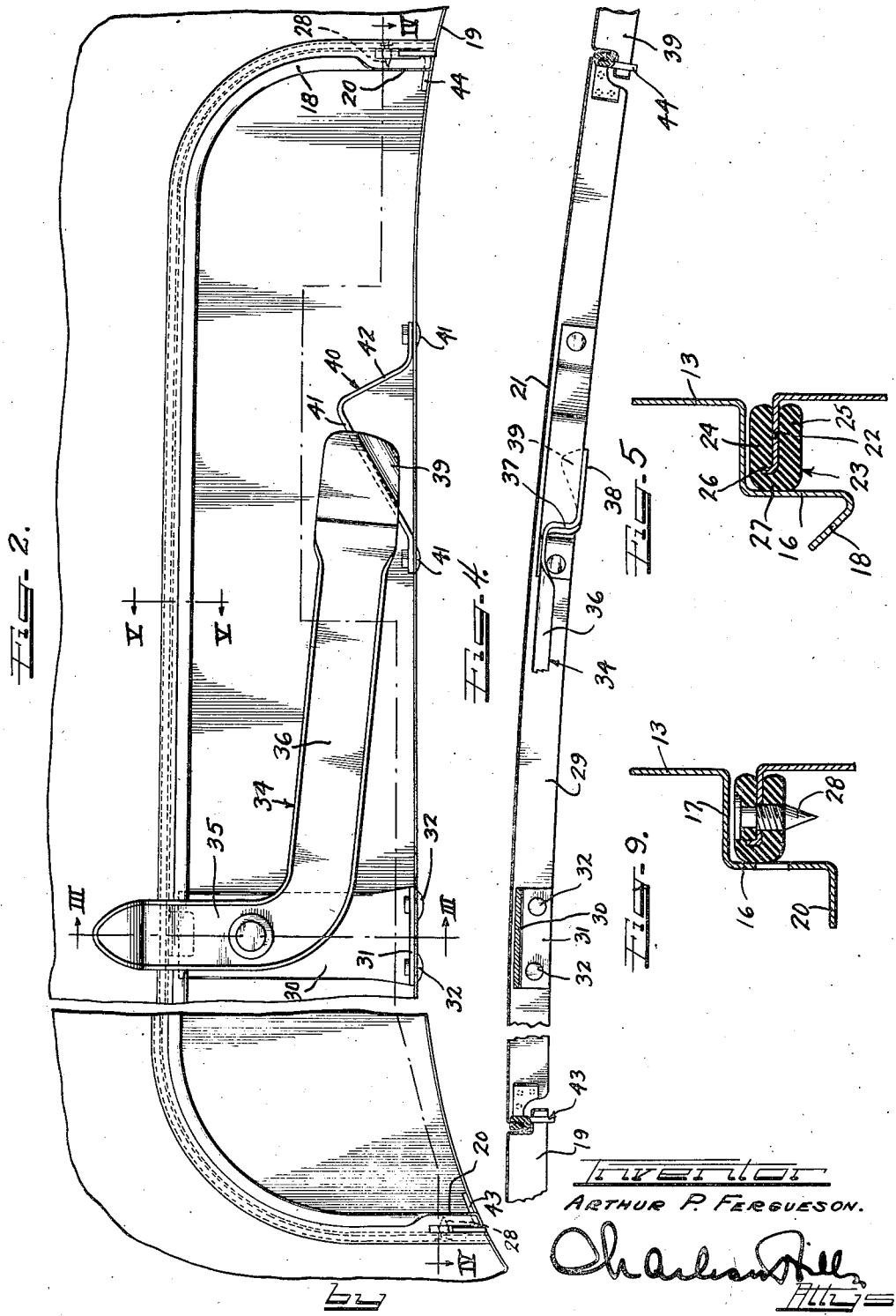
Inventor
ARTHUR P. FERGUESON.

Patented Mar. 2, 1943

2,312,536

UNITED STATES PATENT OFFICE 2,312,536

FENDER SHIELD CONSTRUCTION

Arthur P. Fergueson, Detroit, Mich., assignor to Houdaille-Hershey Corporation, Detroit, Mich., a corporation of Michigan Application February 20, 1941, Serial No. 379,765

4 Claims. (Cl. 280—153)

This invention relates to a fender shield and assembly, and more particularly to a fender shield having novel mounting means thereon for detachably securing the fender shield to the fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in a generally axial direction. Since the modern trend of design has been to cover or partly cover this opening to improve the general appearance of the vehicle fender, detachable fender shields have been employed for this purpose.

As the term "fender shield" shall hereinafter be employed, it refers to any member which is adapted to be secured to a fender or other portion of a vehicle body for the purpose of covering the opening in the fender or vehicle body which is provided for access to or removal of the vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a fender shield of novel construction and characteristics, and particularly a fender shield having novel means for securing the shield to a vehicle fender.

It is a further object of the present invention to provide a fender and fender shield assembly which is economical to manufacture, which may be quickly assembled and disassembled, and which is rugged and reliable in use.

It is a still further object of the present invention to provide novel mounting means for a fender shield having a novel type of supporting arm or trunnion member at each of the lower corners of the shield.

Another object of the present invention is to provide a novel fender shield construction having a novel latching arm arrangement thereon, and also having a novel means for supporting the handle end of the latching arm when the latching arm is in its latched position.

Another and still further object of the present invention is to provide a fender shield construction having a novel cushioning bead or rubber molding around its fender engaging edge, as well as novel means for securing the cushioning bead to the fender shield.

The novel features which I believe to be characteristic of my invention are set forth with particularity in the appended claims. My invention itself, however, both as to its organization and manner of construction, together with further objects and advantages thereof, may best be understood by reference to the accompanying drawings, in which:

Figure 1 is a front elevational view of a vehicle fender with a fender shield mounted thereon;

Figure 2 is an enlarged rear elevational view of the fender shield assembly shown in Figure 1;

Figure 3 is a vertical sectional view of the fender shield assembly as taken along the line III—III of Figure 2;

Figure 4 is a generally horizontal sectional view of the fender sheild assembly as taken along the irregular section line IV—IV of Figure 2;

Figure 5 is a greatly enlarged sectional view of the upper portion of the fender shield assembly as taken along the line V—V of Figure 2 and illustrating the manner in which the fender shield is seated on the offset shoulder of the fender;

Figure 6 is an isometric view of the lower left corner of the fender shield when viewed from the back in Figure 2;

Figure 7 is a greatly enlarged view of the left-hand portion of Figure 4 showing the manner in which one of the supporting arms or trunnion members engages the fender;

Figure 8 is a vertical sectional view of the portion of the assembly shown in Figure 7 and as taken along the line VIII—VIII of Figure 7; and, Figure 9 is an enlarged sectional view taken along the line IX—IX of Figure 8 showing the manner in which the cushioning bead or rubber moulding is secured to the fender shield.

Referring now to the various figures of the drawings, which illustrate one embodiment of the present invention, there is illustrated therein a vehicle fender 10 having a fender shield 11 mounted thereon which partially covers the wheel access opening 12 in the outer depending side wall 13 of the fender 10. While the fender 10 may assume a wide variety of shapes without departing from the spirit and scope of the present invention, and may, indeed, be formed integral and made a part of the body itself (not shown), the fender 10 has been illustrated as being of a high crowned type. It will further be observed that the fender opening in the illustrated embodiment of the invention is of irregular shape and includes a lower opening 14 which is not covered by the fender shield and an upper opening 15 which is covered by the fender shield. The fender opening 12 including the lower portion 14 and the upper portion 15 is of course provided to permit access to and removal of the wheel therethrough.

In order to permit the fender shield 11 to be mounted so that its edge does not directly engage the outer depending side wall 13 of the fender 10, the fender 10 is provided with an offset shoulder 16 which is integrally connected to the depending wall portion 13 by a connecting flange 17. The shoulder 16 has its peripheral edge folded back on itself in an open fold as at 18 to reinforce and stiffen the offset shoulder 16 around its free edge. It will be noted from an inspection of Figure 2 that the folded back peripheral portion extends substantially completely around the upper opening portion 15 but terminates just short of the junction of the upper opening portion 15 with the lower opening portion 14. It will further be observed that the extremity of the fold 18 defines the upper opening 15. The depth of the connecting flange 17 is such that the fender shield 11 is seated on the offset shoulder 16 in such a manner that the outer face of the fender shield 11 is substantially flush with the outer face of the depending wall 13 of the fender 10.

The lower edge of the fender 10 is provided with a rearwardly extending flat flange 19 which extends around the lower opening 14 and merges with the folded back portion 18 of the upper opening 15. That is to say, the flat flange which forms the base edge of the fender 10 extends around the corner of the junction of the upper opening 15 with the lower opening 14 until it meets the folded back portion 18, there being of course a flat flange portion 20 a short distance above each corner, or, in other words, until it meets the folded portion 18.

The fender shield 11 comprises a sheet metal panel 21 which is bulged very slightly outwardly (see Figure 3), and which is large enough to cover the upper wheel opening 15 as well as to overlap the offset shoulder 16. More specifically, the panel 21 is dimensioned to be positioned snugly within the connecting flange 17 and to be seated on the offset shoulder 16 of the fender 10. The top and end edges of the fender shield 11 are bent back into a flange portion 22 upon which is mounted a cushioning bead or rubber molding 23. The rubber molding or cushioning bead is shaped to overlie the outer face of the flange 22 and also to overlie the inner face of the flange 22 in portions 24 and 25, respectively. As an inspection of Figure 5 will show, the rear edge of the flange 22 is bent out as at 26 to provide a lip portion for aiding in retaining the rubber molding 23 in place on the fender shield 11. It will further be observed that the rubber molding 23 extends around this lip portion 26 to provide an abutment portion 27 of the molding which is arranged to be directly seated on the offset shoulder 16 of the fender 10. The molding 23 is secured to the fender shield 11 by a pair of drive screws 28 which are driven through the rubber molding 23 as well as through the flange 22.

For reasons which will at once be apparent to those skilled in the art, the inner portion 25 of the rubber molding 23 is cut away at the two lower corners of the fender shield, as may be seen in Figure 7, and is also cut away at the top of the fender shield opposite the latching mechanism, presently to be described and as shown in Figure 3.

The lower edge of the panel 21 of the fender shield 11 is bent back to form a flat flange 29. This flat flange 29 not only stiffens the fender shield but also provides a seat for other elements of the assembly hereinafter to be described.

The fender shield 11 is further reinforced by a brace bar or strut 30 which extends upwardly behind the panel 21 from the lower base flange 29 to a point in proximity to the top of the fender shield 11. This strut 30 has a base portion 31 which is seated on the base flange 29 and which is riveted or bolted thereto as at 32. In order that the strut 30 may possess sufficient rigidity without an undue amount of metal being required therefor, it is preferably channel-shaped in cross-section.

The upper end of the strut 30 is provided with an angle plate 33 which is welded or otherwise suitably secured to the upper end of the strut 30 and which is arranged to be seated on the under face of the flange 22. This angle plate 33 is also preferably welded or otherwise suitably secured to the flange portion 22 in order to provide a rigid structure.

Mounted on the strut 30 is a latching arm 34 having a short leg portion 35 and a long leg portion 36 disposed at an angle with respect to the short leg portion 35. It will further be observed from an inspection of Figure 3 that the short leg portion 35 is bent to extend around and behind the folded marginal portion 18 of the fender 10. The latching arm 34 may be conveniently mounted on the strut 30 by a mounting stud 37 carried on the strut 30. The long leg portion 36 is of such length that when it is moved to a position to extend substantially vertically downwardly (i. e to an unlatched position) it will extend a substantial distance below the base edge 29 of the fender shield 11. The extremity of the long leg portion 36 is bent outwardly away from the shield as at 37 (Figure 4) and then parallel to the face of the fender shield again in an end portion 38. One side of the end portion 38 is bent obliquely toward the panel 21 of the fender shield as at 39 for a reason presently to be explained.

It has heretofore been the practice to seat the lower end of the latching arm on the base edge or base flange of the fender shield. In view of the fact that the latching arm necessarily extends downwardly to the base flange at an oblique angle, it is clear that a portion of the latching arm would extend below the base flange of the fender and be observable from the outside of the vehicle provided that an offset end portion is employed on the latching arm. This offset end portion has of course been necessary in order that the operator may easily grasp the same. In order to overcome the unsightly appearance of having a portion of the latching lever extending below the base edge of the fender shield and still retain the advantage of an offset end portion which may be quickly and easily grasped, an angle bracket 40 is provided upon which the lower edge of the latching lever 34 is seated. More specifically, the bracket 40 is bolted or riveted to the base flange 29 as at 41. The bracket 40 has two intermediate portions 41 and 42 which extend substantially at right angles to each other but which both extend at oblique angles to the base edge of the fender. As an inspection of Figures 2 and 4 of the drawings will show, the bent out portion 37 of the lower end of the latching lever 34 is arranged to be seated on the oblique portion 41 of the bracket 40; while the bent in corner 39 is arranged to extend under the portion 41. When the lower end of the latching lever 34 is disposed in this position, it will be observed that the short leg portion 35 extends vertically upwardly and is in locked engagement with the folded back edge 18 of the fender 10. It will thus be understood by those skilled in the art that the arrangement of the lower end of the latching lever and the bracket is such that the latching lever is held in its latched position. This, of course, prevents jarring loose of the latching mechanism of the fender shield with a resultant dislodgement of the shield from the fender. Due to the fact that there is a certain amount of give or resiliency in the entire fender shield assembly, it will readily be understood that the latching lever 34 may be freed from its position on the bracket 40 by pulling the lower end of the latching lever 34 away from the panel 21 until the turned out portion 37 of the latching lever rides clear of the bracket 40.

The fender shield 11 is vertically supported and laterally secured against dislodgment at its two lower corners by a pair of supporting arms or trunnion members 43 and 44. In view of the fact that the two supporting arms or trunnion members 43 and 44 are very similar in character, only one will be described in detail. Referring more particularly to Figures 6, 7 and 8, the trunnion member or supporting arm 43 includes a base portion 45 which is spot welded to the base flange 29 of the fender shield 11, an intermediate portion 46 which is spot welded to the flange portion 22 and an end portion 47 which extends at right angles from the panel portion 21 of the fender shield 11. The end portion 47 is notched out as at 48 so as to provide a hook-like shape to the end portion 47. This end portion 47 is arranged to be hooked through holes 49 provided for that purpose in the shoulder 17 of the fender 10. Due to the close proximity of the end portion 47 to the flange 22, the inner portion 25 of the rubber molding 23 is cut back opposite this trunnion member 43. Due to the fact that the base flange 29 of the fender shield 11 in proximity to the corner is curving obliquely downwardly, it will be observed that the base portion 45 of the supporting arm or trunnion member 43 is disposed at an acute angle with respect to the intermediate portion 46 which is seated on the flange 22.

The supporting arm 44 at the opposite end of the fender shield 11 is formed in substantially the identical manner as that described in connection with the supporting arm 43. The only difference is that the base portion will not make quite as an acute angle with the intermediate portion thereof, due to the fact that the base portion 29 of the fender shield 11 at this point has not quite as deep a slope as it does at the other end.

To mount the fender shield 11 on the fender 10, the shield is grasped by the person inserting the shield and held at an angle of approximately 37° with respect to the outer depending side wall 13 of the fender 10. While in this position, the supporting arms or trunnion members are hooked through associated openings in the shoulder 17 of the fender 10. The shield 11 is then rocked about these supporting arms 43 and 44 so as to move the top edge of the fender shield toward the fender. This rocking movement of course takes place in a plane transverse to the plane of the fender opening. When the shield has been rocked into such a position that the rubber molding partially engages the connecting flange 17, the latching arm is rocked from a position in which the lower leg portion is depending substantially vertically downwardly to the position as shown in Figure 2. That is to say, before the shield is hooked onto the fender the latching arm 34 is swung so that the short leg portion 35 thereof extends substantially horizontally away from the strut 30. As the short leg portion 35 is rocked upwardly it will be understood that the top and end edges of the fender shield are pulled into tight seated engagement against the offset shoulder 16 and the connecting flange 17. In order that a tight fit may be assured, the rubber molding is preferably so dimensioned that when the shield is pulled into tight seated engagement, the rubber molding 24 is placed under a slight compressive force. That is to say, the movement of the shield into a position against the offset shoulder 16 of the fender 10 is such as to tightly squeeze the rubber against the offset shoulder 16 and the connecting flange 17.

When the latching lever 34 is rocked so as to place the short leg portion 35 in its latched position, the lower end of the long leg portion 36 is disposed so that the outwardly extending portion 37 is seated on the bracket 40 with the flared in corner portion 39 hooked under the oblique portion 41 of the bracket 40. The fender shield is now tightly latched and secured to the fender 10.

To remove the fender shield 11 from the fender 10, the lower end of the long leg portion 36 is grasped by reaching under the fender shield, and the end thereof is then pulled outwardly and downwardly. The downward movement of the latching lever 34 is continued until the short leg portion 35 rides clear and free of the turned edge 18. The shield is then rocked out and lifted out of its hooked engagement with the fender.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A fender shield including a panel, the edges of which merge into rearwardly extending top, end and base flanges, and supporting arms each having an angularly shaped base seated against and secured to one of said end flanges and said base flange.

2. A fender shield including a panel, the edges of which merge into rearwardly extending top, end and base flanges, and supporting arms for supporting said shield on a vehicle fender, said supporting arms each having a hook-shaped end portion extending substantially at right angles to said panel, and a base, said base being angularly shaped to fit and be seated against one of said end flanges and said base flange.

3. A fender shield including a panel, the edges of which merge into rearwardly extending top, end and base flanges, at least one of said end flanges and said base flange forming an acute angle with each other, and a supporting arm having a base seated against and secured to both said end flange and to said base flange at their junction where they make an acute angle with each other.

4. A fender shield including a panel, the edges of which merge into rearwardly extending top, end and base flanges, supporting arms for detachably securing said fender shield on a vehicle fender, each of said supporting arms having a double base portion and a free arm portion extending substantially at right angles to said panel, one part of said double base portion being secured to said base flange and the other part of said double base portion extending upwardly and secured to one of said end flanges, the lower edge of said free end portion of said supporting arm having a notch cut out of the lower edge thereof for hooking engagement with a vehicle fender.

ARTHUR P. FERGUESON.